(12) United States Patent
Kim

(10) Patent No.: US 10,480,339 B2
(45) Date of Patent: Nov. 19, 2019

(54) SEALING ASSEMBLY

(71) Applicant: DOOSAN HEAVY INDUSTRIES CONSTRUCTION CO., LTD., Gyeongsangnam-do (KR)

(72) Inventor: Kyung Kook Kim, Daejeon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 106 days.

(21) Appl. No.: 15/299,682

(22) Filed: Oct. 21, 2016

(65) Prior Publication Data

US 2017/0114655 A1    Apr. 27, 2017

(30) Foreign Application Priority Data

Oct. 23, 2015 (KR) .......................... 10-2015-0148307

(51) Int. Cl.
*F01D 11/02* (2006.01)
*F01D 11/04* (2006.01)
*F16J 15/447* (2006.01)
*F16J 15/40* (2006.01)

(52) U.S. Cl.
CPC .............. *F01D 11/02* (2013.01); *F01D 11/04* (2013.01); *F16J 15/406* (2013.01); *F16J 15/4472* (2013.01); *F05D 2220/31* (2013.01); *F05D 2240/55* (2013.01); *F05D 2250/15* (2013.01); *F05D 2250/25* (2013.01)

(58) Field of Classification Search
CPC .... F16J 15/447; F16J 15/4472; F16J 15/4474; F16J 15/4476; F16J 15/4478; F01D 11/02

USPC .................................. 277/430, 431, 432, 559
See application file for complete search history.

(56) References Cited

U.S. PATENT DOCUMENTS

| 450,004 | A | * | 4/1891 | Daley ..................... F16J 15/406 |
| | | | | 277/430 |
| 1,189,457 | A | * | 7/1916 | Levy ........................ A47L 15/06 |
| | | | | 134/194 |
| 2,109,680 | A | * | 3/1938 | Neveling, Sr. ......... F04D 29/106 |
| | | | | 277/430 |

(Continued)

FOREIGN PATENT DOCUMENTS

| DE | 668667 C | * 12/1938 | ........... F16J 15/4472 |
| JP | 09-053411 A | 2/1997 | |

(Continued)

OTHER PUBLICATIONS

An extended European search report issued by the European Patent Office dated Mar. 3, 2017 in connections with European patent application No. 16195134.8.

(Continued)

*Primary Examiner* — Vishal A Patel
*Assistant Examiner* — L. Susmitha Koneru
(74) *Attorney, Agent, or Firm* — Invenstone Patent, LLC

(57) ABSTRACT

A sealing assembly includes a first sealing member disposed on a fixed body and a second sealing member disposed on a rotating body while facing the first sealing member, such that when the second sealing member rotates, the first sealing member and the second sealing member work in conjunction with each other to generate flow of fluid in a reverse direction and form a fluid barrier, thereby preventing leakage of the fluid.

3 Claims, 10 Drawing Sheets

(56) References Cited

U.S. PATENT DOCUMENTS

| | | | | |
|---|---|---|---|---|
| 3,131,942 A * | 5/1964 | Ertaud | ................... | F16J 15/406 |
| | | | | 277/430 |
| 3,355,179 A * | 11/1967 | McGrew, Jr. | .......... | F16J 15/406 |
| | | | | 277/430 |
| 3,620,540 A * | 11/1971 | Jagger | ................. | F16J 15/3244 |
| | | | | 277/559 |
| 3,661,400 A * | 5/1972 | Weinand | .............. | F16J 15/3244 |
| | | | | 277/559 |
| 3,700,247 A * | 10/1972 | Butler | ................ | B29C 47/0808 |
| | | | | 159/2.2 |
| 3,795,386 A * | 3/1974 | Carter | ................... | F16J 15/406 |
| | | | | 100/145 |
| 4,010,960 A * | 3/1977 | Martin | ................... | F16J 15/406 |
| | | | | 277/430 |
| 4,305,592 A * | 12/1981 | Peterson | .............. | B63H 23/321 |
| | | | | 277/430 |
| 4,368,895 A * | 1/1983 | Okamoto | ............... | F16J 15/406 |
| | | | | 277/347 |
| 4,545,588 A * | 10/1985 | Nagai | .................... | F16J 15/406 |
| | | | | 277/348 |
| 5,029,876 A | 7/1991 | Orlando et al. | | |
| 5,639,095 A * | 6/1997 | Rhode | .................. | F16J 15/4472 |
| | | | | 277/303 |
| 6,039,535 A * | 3/2000 | Kobayashi | ............ | F04D 29/102 |
| | | | | 415/172.1 |
| 6,592,337 B2 * | 7/2003 | Yamada | ............... | F16J 15/3232 |
| | | | | 277/549 |
| 6,688,603 B2 * | 2/2004 | vom Schemm | ...... | F16J 15/3216 |
| | | | | 277/549 |
| 6,921,080 B2 * | 7/2005 | Johnen | ................. | F16J 15/3244 |
| | | | | 277/549 |
| 7,004,475 B2 * | 2/2006 | McHale | ................. | F16J 15/442 |
| | | | | 277/411 |
| 7,419,165 B2 * | 9/2008 | Toth | ..................... | F16J 15/3224 |
| | | | | 277/549 |
| 9,650,907 B2 * | 5/2017 | Bricaud | .................. | F01D 11/02 |
| 2009/0058013 A1 * | 3/2009 | Bulgrin | ................. | F01D 11/001 |
| | | | | 277/419 |
| 2012/0193875 A1 * | 8/2012 | Deo | ...................... | F01D 11/003 |
| | | | | 277/412 |
| 2013/0075975 A1 * | 3/2013 | Hilaris | ................ | F04C 15/0003 |
| | | | | 277/350 |
| 2015/0040566 A1 | 2/2015 | Danescu et al. | | |
| 2015/0086343 A1 * | 3/2015 | Rizzo | .................... | F04D 29/102 |
| | | | | 415/173.5 |

FOREIGN PATENT DOCUMENTS

| | | |
|---|---|---|
| JP | 2009062979 A | 3/2009 |
| KR | 20140043157 A | 4/2014 |
| WO | 2013160469 A1 | 10/2013 |

OTHER PUBLICATIONS

Korean Office Action issued by the Korean Intellectual Property Office dated Aug. 19, 2016 in connection with Korean Patent Application No. 10-2015-0148307.

An International Search Report dated Feb. 2, 2017 in connection with International patent application No. PCT/KR2016/011930.

* cited by examiner

SEALING ASSEMBLY

CROSS-REFERENCE TO RELATED APPLICATION(S)

This application claims priority to Korean Patent Application No. 10-2015-0148307, filed on Oct. 23, 2015 the disclosure of which is incorporated herein by reference in its entirety.

BACKGROUND

In general, a gas turbine includes a compressor, a combustor, and a turbine. A turbine, which is a power generating device that converts heat energy of fluids (e.g., gas, steam, etc.) into mechanical energy such as rotational force, for example, includes a rotor with a plurality of buckets so as to be axially rotated by the fluid, and a casing with one or more diaphragms installed to surround the rotor. As the compressor rotates, outside air is sucked in and compressed to be sent to the combustor. The compressed air and fuel is mixed with each other in the combustor such that combustion occurs. High-pressure and high-temperature gas generated in the combustor rotates the rotor of the turbine as the high-pressure and high-temperature gas flow through the turbine. The rotation of the rotor may drive a generator, for example, to generate electricity.

In a steam turbine, a high-pressure turbine, a medium-pressure turbine, and a low-pressure turbine are connected in series or in parallel to rotate the rotor. In a case of serial connection, the high-pressure turbine, the medium-pressure turbine, and the low-pressure turbine share one rotor. Each of the turbines includes diaphragms and buckets based on the rotor in the casing, and steam rotates the rotor while passing through the diaphragms and the buckets, thereby driving a generator, for example.

In this case, the gas turbine and the steam turbine have a structure in which a rotating body (rotor) rotates with respect to a fixed body (diaphragm). Therefore, high-temperature and high-pressure fluid may leak due to a gap between the fixed body and the rotating body, thereby causing decrease in energy efficiency due to power loss. There has been continual efforts to decrease the leakage of fluid through the gap between the rotating body and the fixed body.

In order to minimize the leakage of fluid, the gap between the rotating body and the fixed body needs to be minimized. However, there are various restrictions in narrowing the gap. For example, if the gap is excessively narrow, interference between the rotating body and the fixed body can occur upon axial rotation of the rotating body, such that vibration is generated due to rubbing, which causes severe damage to the turbine.

Meanwhile, in the steam turbine, since the high-temperature steam introduced from a boiler heats the rotating body and the fixed body, the rotating body and the fixed body may expand or contract by several millimeters to several tens of millimeters depending on the position at the time of the operation and the start and stop. Here, since material characteristics of the rotating body and the fixed body are different from each other, the rotating body and the fixed body expand or contract differentially. Further, an expanding direction is also different depending on the turbine structure. Therefore, the interference is caused between the rotating body and the fixed body during the operation, thereby causing rubbing.

Recently, sealing technology including a honeycomb seal and a labyrinth seal to reduce the gap between a rotating body and a fixed body have been used in gas and steam turbines in which the honeycomb seal and the labyrinth seal flexibly contact each other.

Referring to FIG. 1, a honeycomb seal 3 is disposed on the fixed body 4 of the turbine, and labyrinth seal 2 is disposed on the rotating body 1 of the turbine so as to adjacently face the honeycomb seal 3. In this case, a gap between the honeycomb seal 3 and the labyrinth seal 2 is narrowed, and the number of tooth of the labyrinth seal 2 is increased in order to prevent leakage of fluid as shown by arrows illustrated in FIG. 1.

When the gap is narrowed so that the honeycomb seal 3 and the labyrinth seal 2 do not contact each other, a space through which the fluid may leak is reduced. When the number of tooth of the labyrinth seal 2 is increased, fluid pressure is decreased every time the fluid passes through the tooth, thereby slowing down the flow of leaked fluid. As such, the leakage of the fluid through the gap between the rotating body 1 and the fixed body 4 of the turbine is prevented or minimized.

However, according to the existing sealing method and structure, even though a predetermined gap is formed between the honeycomb seal 3 and the labyrinth seal 2, the gap may change due to vibration and thermal expansion of the materials, etc. during the operation of the turbine, thereby increasing the wear rate of the sealing components due to rubbing. This ultimately may lead to damage to blade or turbine components. Further, as the sealing components wear down, sealing capability is degraded, and the fluid is leaked, such that output efficiency of the turbine is deteriorated.

Therefore, an apparatus capable of maintaining the sealing capability even when the sealing gap between the rotating body 1 and the fixed body 4 is moderately widened depending on the operational environment of the turbine is required.

BRIEF SUMMARY

Exemplary embodiments below relate to a sealing assembly of a turbine, for example, and more particularly, to a sealing assembly capable of preventing leakage of fluid and decreasing wear rate of the sealing components by generating a flow of fluid in a reverse direction between a rotating body and a fixed body. Exemplary embodiments below provide an apparatus capable of decreasing a ware rate of sealing components between a rotating body and a fixed body regardless of an operational environment of a turbine, allowing return of the remaining fluid in a gap between the sealing components, and preventing leakage of the fluid by generating a flow of fluid in a reverse direction.

In an exemplary embodiment, a sealing assembly includes a first sealing member disposed on an inner circumferential surface of a fixed body, a second sealing member disposed on an outer circumferential surface of a rotating body configured to rotate with respect to the first sealing member, and a fluid barrier formed between the first sealing member and the second sealing member by transfer fluid flowing in a direction reverse to a direction of a fluid leak.

The second sealing member may include a sealing body part disposed on the outer circumferential surface of the rotating body, and a tooth part disposed on the sealing body part and including a spiral to form the fluid barrier in a gap between the first sealing member and the second sealing member.

The tooth part may further include a step disposed on the sealing body part configured to push rotating fluid toward the introduction direction side of the leaked fluid.

The second sealing member may further include a protrusion connected with the spiral configured to push fluid toward an outer side of a rotation direction.

The tooth part y further include one or more circular rings.

DETAILED DESCRIPTION

Hereinafter, exemplary embodiments of a sealing assembly in a turbine, for example, will be described in detail with reference to the accompanying drawings.

Figure 1:
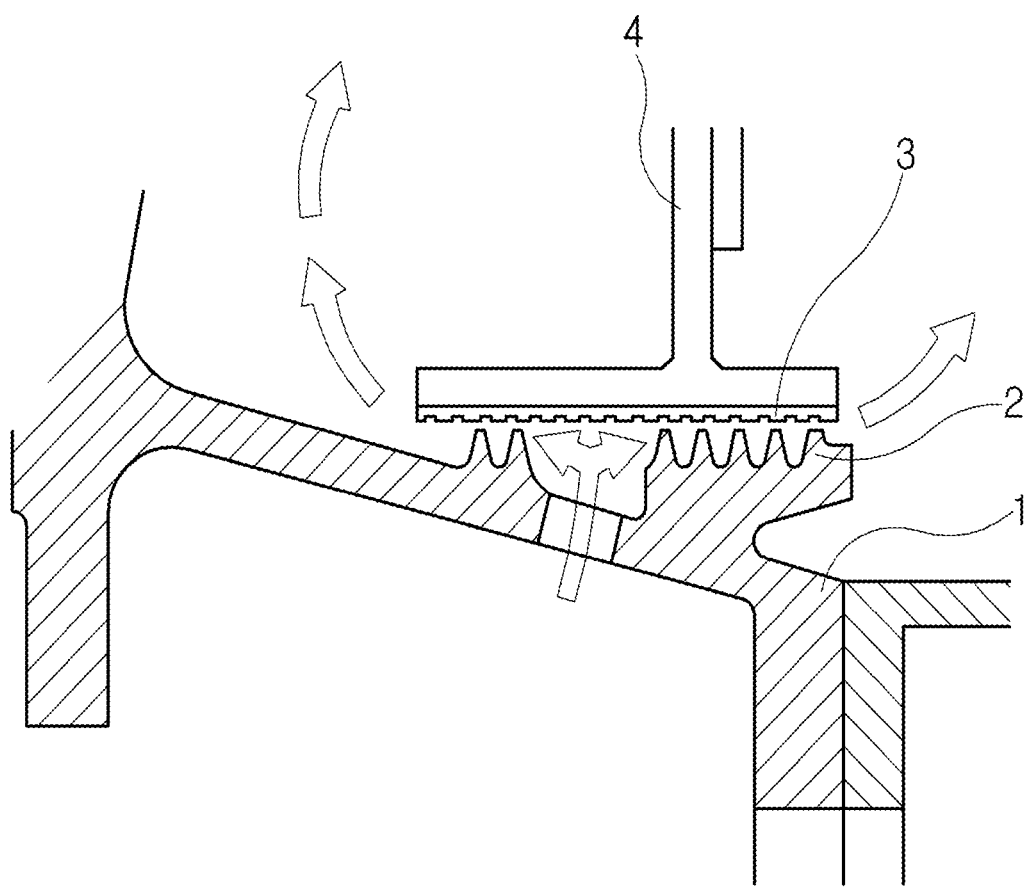
FIG. 1 is a sectional view showing a sealing structure of a turbine according to a related art.
Figure 2A:
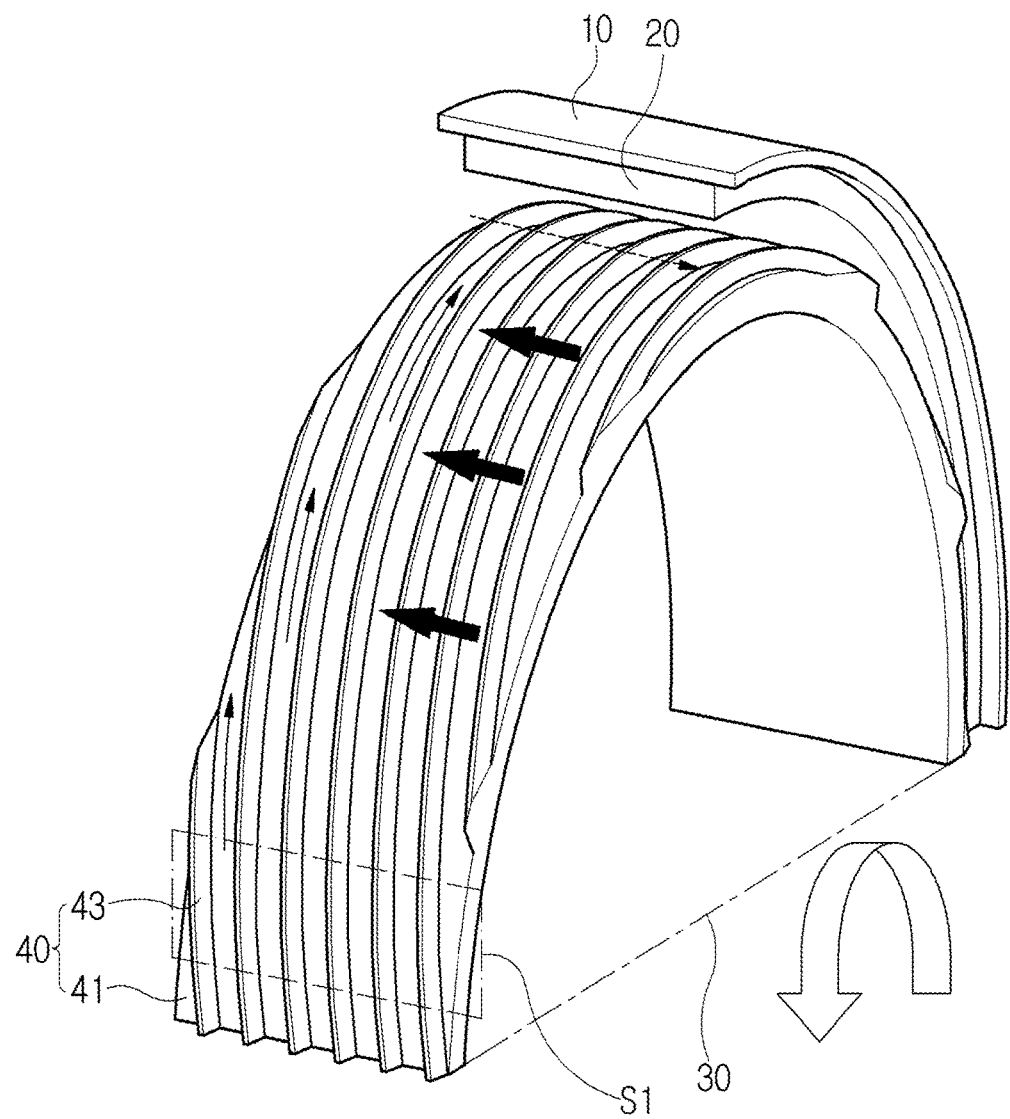
FIG. 2A is a partial perspective view showing a sealing assembly according to a first exemplary embodiment.
Figure 2B:
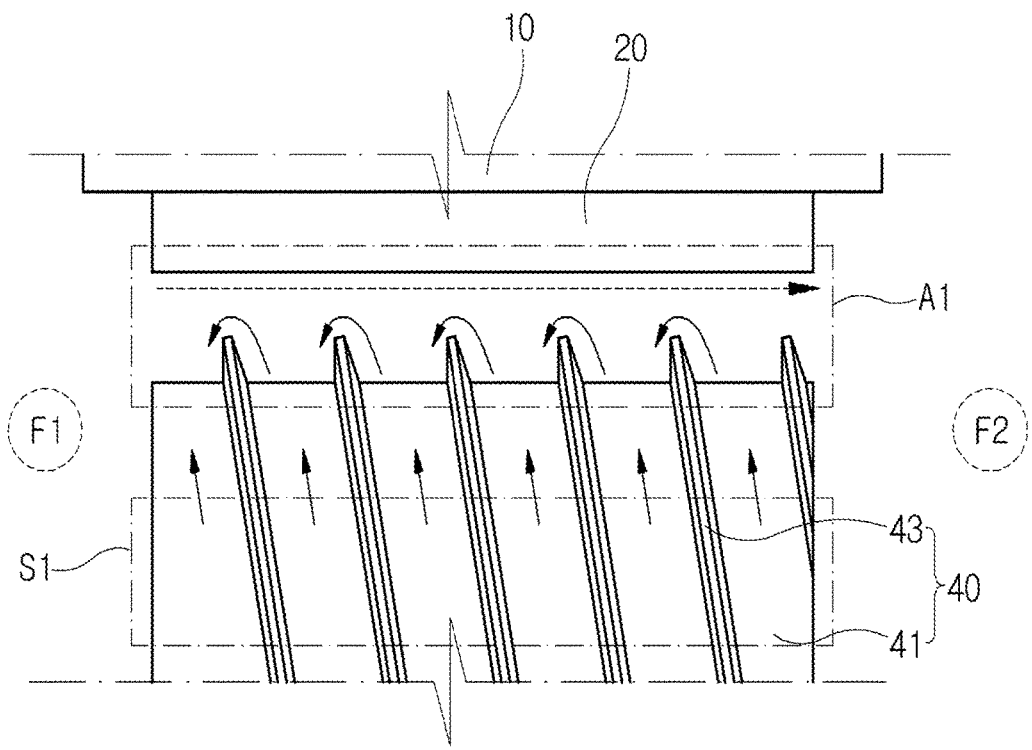
FIG. 2B is a partial side view of FIG. 2A.

FIG. 2A is a partial perspective view showing a sealing assembly according to a first exemplary embodiment, and FIG. 2B is a partial side view of FIG. 2A. Referring to FIGS. 2A and 2B, a sealing assembly according to the first exemplary embodiment may include a first sealing member 20 and a second sealing member 40.

The first sealing member 20 may be disposed on an inner surface of a fixed body 10 of a turbine, for example, in a circumferential direction, and may have a ring shape. The fixed body 10 may be a diaphragm and a casing of the turbine on which the diaphragm is mounted, for example. The first sealing member 20 may be a honeycomb seal having a honeycomb structure (not shown).

Further, the second sealing member 40 may be disposed on an outer surface of a rotating body 30 in a circumferential direction while facing the first sealing member 20, and may have a ring shape. The rotating body 30 may be a bucket and a rotor of a turbine on which the bucket is mounted, for example. The second sealing member 40 may be a labyrinth seal having a plurality of protrusions formed thereon.

The second sealing member 40 may include a sealing body part 41 and a tooth part 43. The sealing body part 41 may be mounted on the outer surface of the rotating body 30 of the turbine in the circumferential direction, and the tooth part 43 may be disposed on the sealing body part 41 to protrude therefrom. The tooth part 43 may be formed including a spiral 51 in a direction reverse to a direction in which the fluid is leaked.

Referring to FIGS. 2A and 2B, the spiral 51 is disposed on the sealing body part 41. When the rotating body 30 rotates such as from a rotor driven in a turbine, for example, the second sealing member 40 mounted on the rotating body 30 rotates together therewith. Accordingly, as the spiral 51 rotates, the fluid leaked through the gap between the first sealing member 20 and the second sealing member 40 is moved back in the direction reverse to the direction in which the fluid is leaked. That is, as show in FIG. 2B, the leaked fluid flows in the circumferential direction along the spiral S1, and is returned to an introduction region F1 of the leaked fluid opposite region F2, thereby blocking the leakage of the fluid.

As the second sealing member 40 rotates, rotating air current is generated along a peripheral circumference of the second sealing member 40 in the gap between the second sealing member 40 and the first sealing member 20. The fluid is pushed little by little toward the outer side by the centrifugal force when being transferred in the direction reverse to the direction in which the fluid is leaked by the rotation of the spiral S1. The rotating air current acts as a force pushing the fluid transferred toward the introduction region F1 of the leaked fluid in an outer circumferential direction of the second sealing member 40. As a result, a fluid barrier (A1 region in FIG. 2B) is formed in the gap between the first sealing member 20 and the second sealing member 40 in the direction reverse to the direction in which the fluid is leaked. The fluid barrier also hinders the leakage of the fluid passing through the gap between the first sealing member 20 and the second sealing member 40, thereby ultimately preventing the leakage of the fluid.

The spiral S1 may be wound a plurality of times on the sealing body part 41 and integrally formed with the sealing body part 41. When the first sealing member 20 is a honeycomb seal and the second sealing member 40 is a labyrinth seal, for example, fluid pressure of the leaked fluid is basically decreased every time the leaked fluid passes through the honeycomb structure of the honeycomb seal and the plurality of protrusions of the labyrinth seal. As a result, the flow of the fluid is decreased toward a leakage region F2 of the leaked fluid from the introduction region F1, such that the leakage is blocked or minimized.

As illustrated in FIG. 2A, as the spiral S1 according to the exemplary embodiment is integrally wound a plurality of times on the sealing body part 41, the leaked fluid does not remain in the gap between the first sealing member 20 and the second sealing member 40. As the spiral S1 rotates in response to the rotation of the rotating part 30 of a rotor, for example, it is possible to effectively return the leaked fluid back to the introduction region F1 of the leaked fluid. As such, the leaked fluid may be transferred in the direction reverse to the direction in which the fluid is leaked by the rotation of the spiral S1, and the fluid barrier is formed in the gap between the first sealing member 20 and the second sealing member 40 by using the air current generated by the rotation of the rotating body 30 of the turbine to hinder the leakage flow of the fluid, thereby ultimately preventing the leakage of the fluid.

Figure 3A:
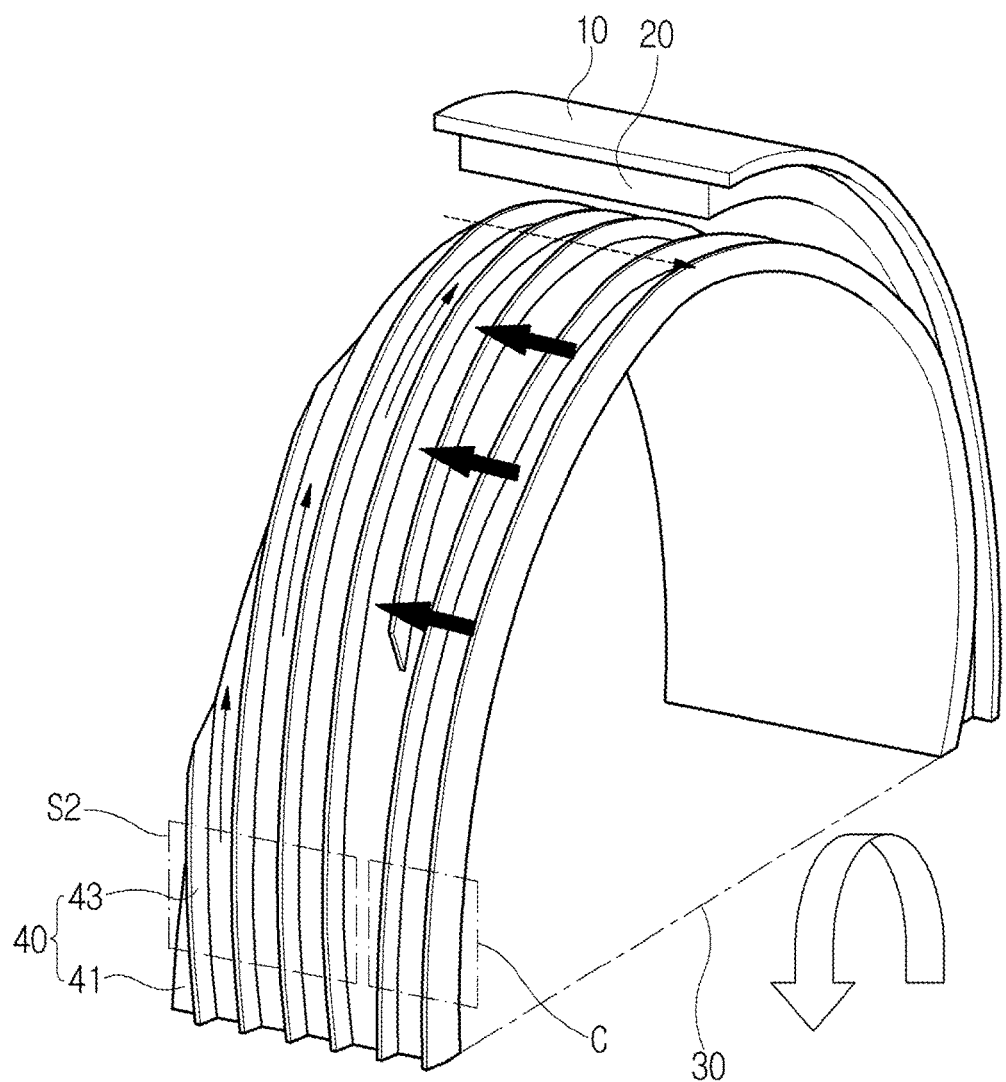
FIG. 3A is a partial perspective view showing a sealing assembly according to a second exemplary embodiment.
Figure 3B:
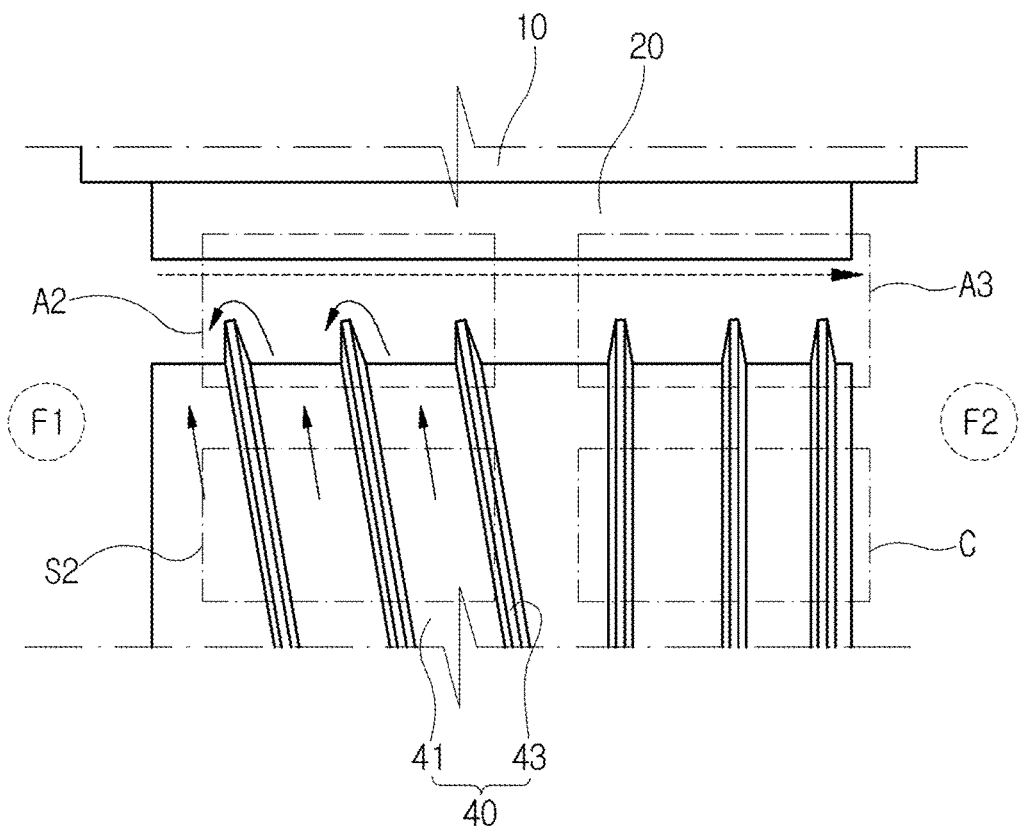
FIG. 3B is a partial side view of FIG. 3A.

FIG. 3A is a partial perspective view showing a sealing assembly according to a second exemplary embodiment, and FIG. 3B is a partial side view of FIG. 3A. Referring to FIGS. 3A and 3B, a sealing assembly according to a second exemplary embodiment may include a first sealing member 20 and a second sealing member 40. The description of the disposition and the material for the first sealing member 20 and the second sealing member 40 is the same as that of the first exemplary embodiment, and thus will not be described again.

An exemplary configuration of the second sealing member 40 will be described in detail. The second sealing member 40 may include a sealing body part 41 and a tooth part 43. The sealing body part 41 may be mounted on the outer surface of the rotating body 30 in the circumferential direction, and the tooth part 43 may be disposed on the sealing body part 41 to protrude therefrom. The tooth part 43 may be formed including a spiral S2 in a direction reverse to a direction in which the fluid is leaked. Referring to FIGS. 3A and 3B, the spiral S2 is disposed on the sealing body part 41. However, unlike the first exemplary embodiment above, the tooth part 43 according to the second exemplary embodiment is divided into two regions. One region has the spiral S2 formed thereon, and the other region has a circular ring C formed thereon.

One or more circular rings C may be disposed at the leakage region F2 side of the leaked fluid on the sealing body part 41 in the circumferential direction. The circular ring C may have a protrusion shape, and when the circular ring C is disposed on the sealing body part 41 in plural, fluid pressure of the leaked fluid is decreased while the leaked fluid passes between the first sealing member 20 and the circular ring C. As a result, the leakage flow of the fluid is decreased, and the movement of the fluid toward the leakage region F2 of the leaked fluid is slowed down (A3 region in FIG. 3B).

In addition, the spiral S2 may be disposed at the introduction region F1 side of the leaked fluid on the sealing body part 41 (A2 region in FIG. 3B). As the spiral part S2 rotates in response to the rotation of the rotating body 30 of a rotor, for example, the fluid leaked through the gap between the first sealing member 20 and the second sealing member 40 is moved back in the direction reverse to the direction in which the fluid is leaked. The leaked fluid flows in the circumferential direction along the spiral S2, and is returned to the introduction region F1 of the leaked fluid, thereby blocking the leakage of the fluid. In order to primarily return the leaked fluid and to reduce the fluid pressure of the fluid passing through the spiral S2 so that the fluid does not leak, the spiral S2 is disposed closer to the introduction region F1 side of the leaked fluid on the sealing body part 41, and the circular ring C is disposed closer to the leakage region F2 side of the leaked fluid on the sealing body part 41.

As the second sealing member 40 rotates, rotating air current is generated a along a peripheral circumference of the second sealing member 40 in the gap between the second sealing member 40 and the first sealing member 20. The fluid is pushed little by little toward the outer side by the centrifugal force when being transferred in the direction reverse to the direction in which the fluid is leaked by the rotation of the spiral part S2. The rotating air current acts as a force pushing the fluid transferred toward the introduction region F1 of the leaked fluid in an outer circumferential direction of the second sealing member 40. As a result, a fluid barrier (A2 region of FIG. 3B) is formed in the gap between the first sealing member 20 and the second sealing member 40 in the direction reverse to the direction in which the fluid is leaked. The fluid barrier also hinders the leakage of the fluid passing through the gap between the first sealing member 20 and the second sealing member 40, thereby ultimately preventing the leakage of the fluid.

The spiral S2 may be wound a plurality of times on the sealing body part 41 and integrally formed with the sealing body part 41. Accordingly, the leaked fluid does not remain in the gap between the first sealing member 20 and the second sealing member 40, and as the spiral S2 rotates in response to the rotation of the rotating body 30, it is possible to effectively return the leaked fluid back to the introduction region F1 of the leaked fluid. As such, the leaked fluid may be transferred in the direction reverse to the direction in which the fluid is leaked by the rotation of the spiral part S2, and the fluid barrier (A2 region in FIG. 3B) is formed in the gap between the first sealing member 20 and the second sealing member 40 by using the air current generated by the rotation of the rotating body 30 of the turbine to hinder the leakage flow of the fluid. Further, the fluid pressure of the fluid passing through the spiral part S2 is decreased at the circular ring C, such that the flow of the fluid is decreased to block the leakage, thereby ultimately preventing the leakage of the fluid.

Figure 4A:
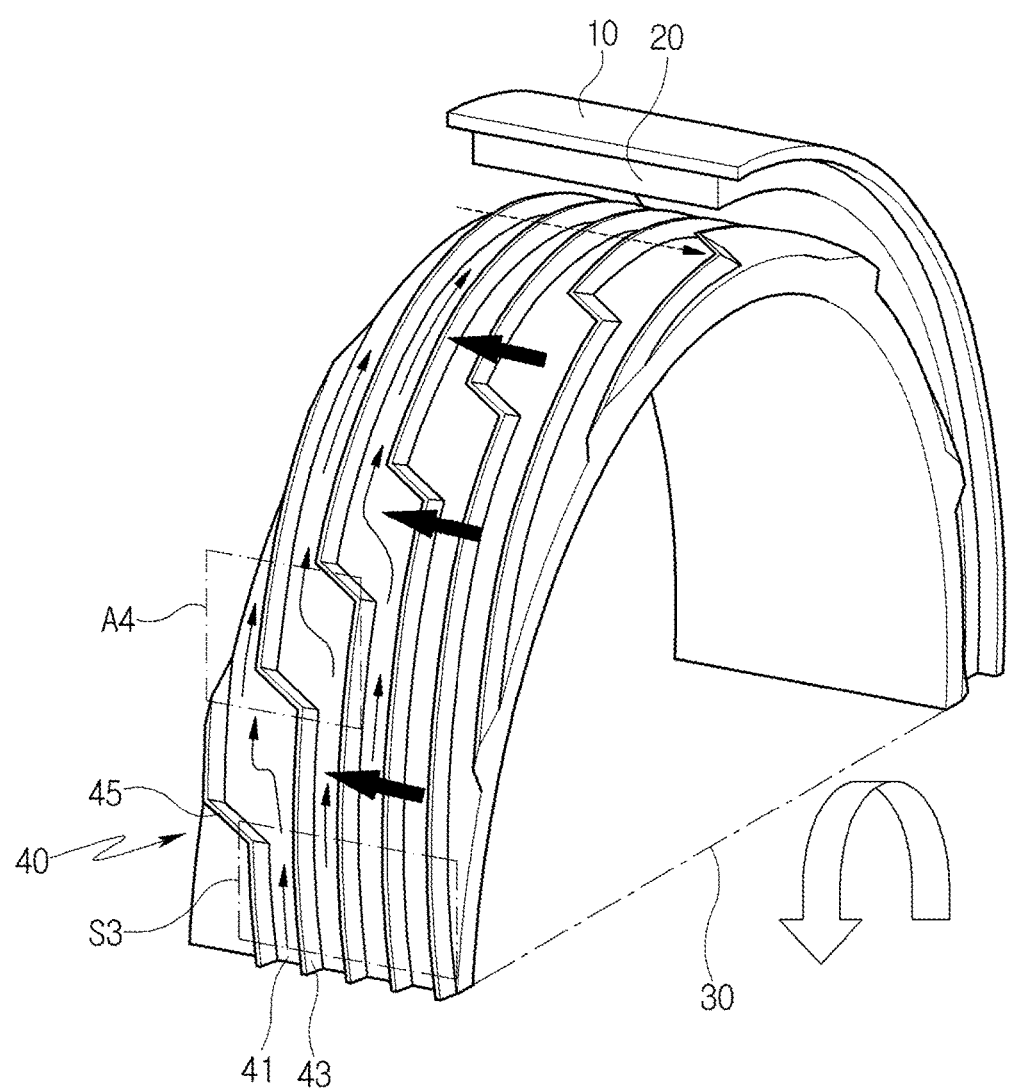
FIG. 4A is a partial perspective view showing a sealing assembly according to a third exemplary embodiment.
Figure 4B:
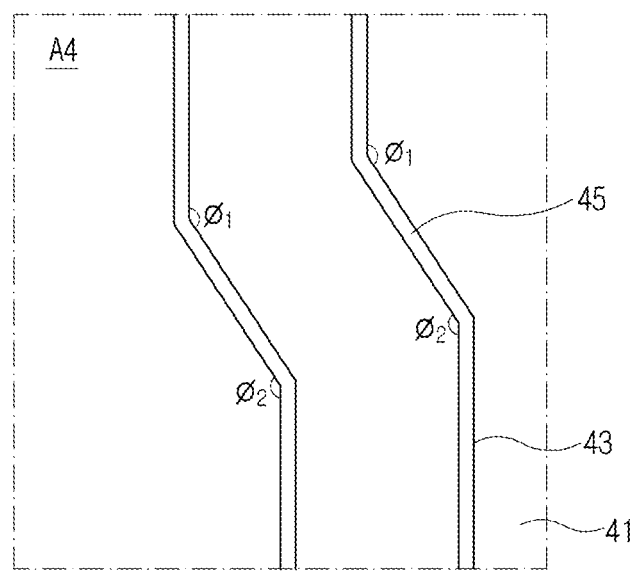
FIG. 4B is a partially enlarged view of FIG. 4A.

FIG. 4A is a partial perspective view showing a sealing assembly according to a third exemplary embodiment, and FIG. 4B is a partially enlarged view of FIG. 4A. Referring to FIGS. 4A and 4B, a sealing assembly according to a third exemplary embodiment may include a first sealing member 20 and a second sealing member 40. The description of the disposition and the material for the first sealing member 20 and the second sealing member 40 is the same as that of the first exemplary embodiment, and thus will not be described again.

Describing an exemplary configuration of the second sealing member 40 in detail, the second sealing member 40 may include a sealing body part 41 and a tooth part 43. The sealing body part 41 may be mounted on the outer surface of the rotating body 30 in the circumferential direction, and the tooth part 43 may be disposed on the sealing body part 41 to protrude therefrom. The tooth part 43 may be formed including a spiral S3 in a direction reverse to a direction in which the fluid is leaked. Referring to FIGS. 4A and 4B, the spiral S3 is disposed on the sealing body part 41. Shape and function of the spiral S3 are the same as in the first exemplary embodiment, and thus will not be described again.

According to the third exemplary embodiment, the tooth part 43 may further include a step 45. The step 45 may be disposed on the sealing body part 41 so that the rotating fluid is pushed toward the introduction region F1 of the leaked fluid. In detail, the step 45 may be connected to the spiral S3 as illustrated in FIG. 4A. Accordingly, the fluid rotating and transferred along the spiral S3 may be moved while being pushed step by step toward the introduction region F1 of the leaked fluid by the step 45. Thus, the leaked fluid may be returned more rapidly in the reverse direction.

The step 45 may be connected to the spiral S3 at a predetermined angle ($\Phi 1$ and $\Phi 2$). Here, the angle formed between the step 45 and the spiral S3 may be appropriately selected depending on the operational environment, such as a rotation speed of the rotor, characteristics of the operating fluid, etc.

For example, in a case of an operational environment in which the rotation speed of the rotating body 30 is fast, or in a case in which viscosity of the operating fluid such as gas, steam, or the like is large, the angle ($\Phi 1$ and $\Phi 2$) formed between the step 45 and the spiral S3 may be large in order to make the flow of the fluid smooth. On the other hand, in a case of an operational environment in which the rotation speed of the rotor is slow, or in a case in which flowability is secured due to low viscosity of the operating fluid, the angle ($\Phi 1$ and $\Phi 2$) formed between the step 45 and the spiral S3 may be small, such that the fluid is pushed further toward the introduction region F1 of the leaked fluid. As such, in addition to the effect of preventing the leakage of the fluid that is presented in the first exemplary embodiment, the rotating fluid is pushed toward the introduction direction of the leaked fluid more rapidly through the step 45, such that the leaked fluid may be more quickly returned in the reverse direction.

Figure 5A:
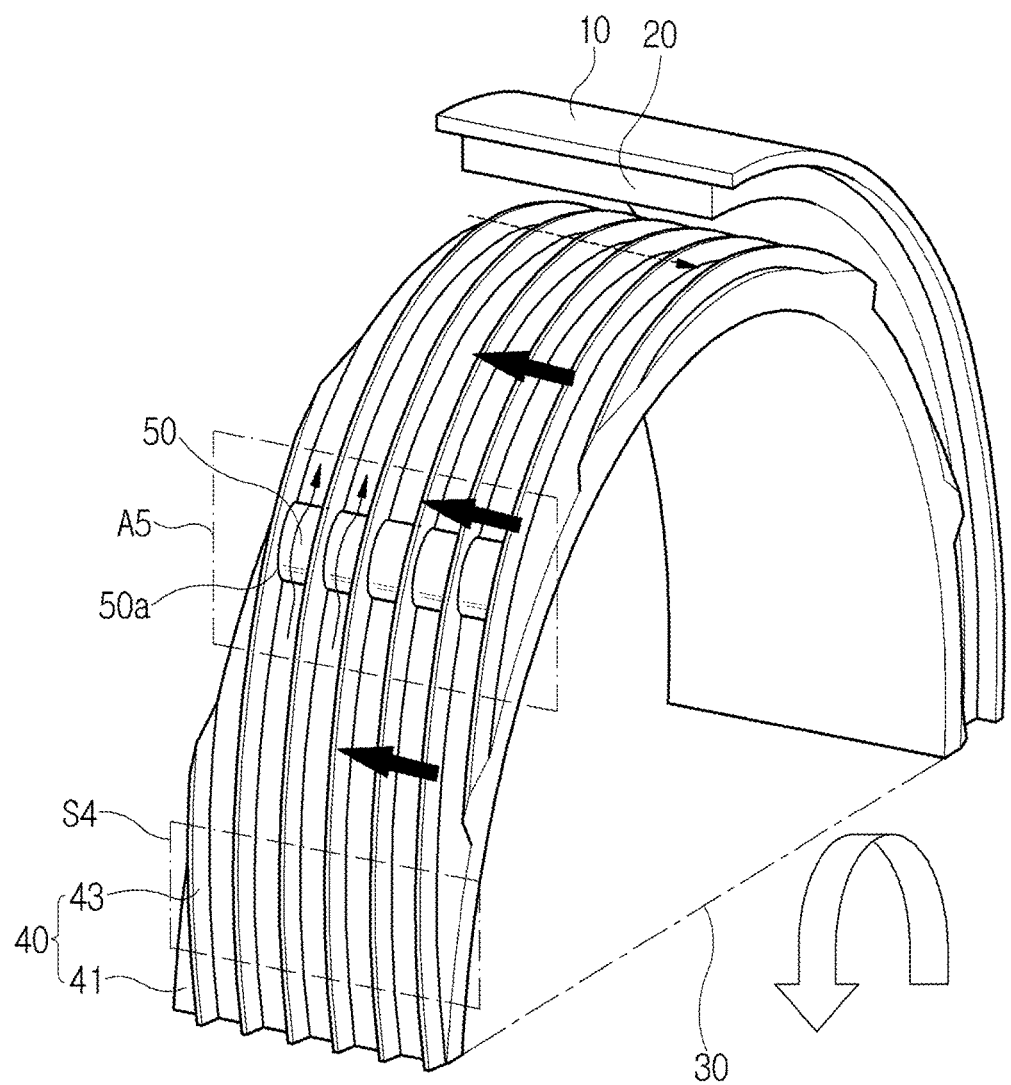
FIG. 5A is a partial perspective view showing a sealing assembly according to a fourth exemplary embodiment.
Figure 5B:
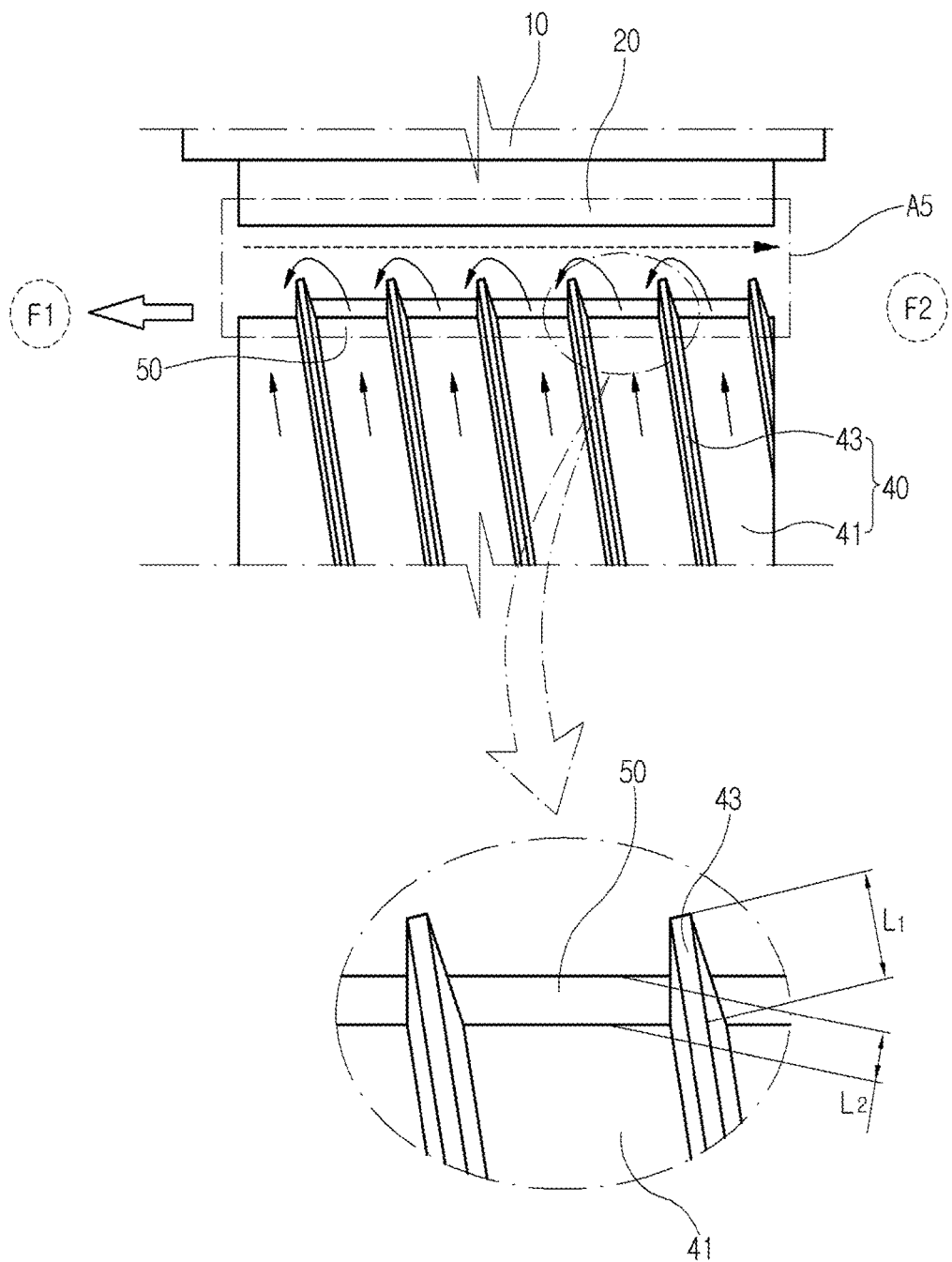
FIG. 5B is a partial side view of FIG. 5A.

FIG. 5A is a partial perspective view showing a sealing assembly according to a fourth exemplary embodiment, and FIG. 5B is a partial side view of FIG. 5A. Referring to FIGS.

5A and 5B, a sealing assembly according to a fourth exemplary embodiment may include a first sealing member 20 and a second sealing member 40. The description of the disposition, the shape, and the material for the first sealing member 20 and the second sealing member 40 is the same as that of the first exemplary embodiment, and thus will not be described again.

Describing an exemplary configuration of the second sealing member 40 in detail, the second sealing member 40 may include a sealing body part 41, a tooth part 43, and a protrusion 50. The sealing body part 41 may be mounted on the outer surface of the rotating body 30 in the circumferential direction, and the tooth part 43 may be disposed on the sealing body part 41 to protrude therefrom. The tooth part 43 may be formed including a spiral S4 in a direction reverse to a direction in which the fluid is leaked. Referring to FIGS. 5A and 5B, the spiral S4 is disposed on the sealing body part 41. Shape and function of the spiral S4 are the same as in the first exemplary embodiment, and thus will not be described again.

According to the fourth exemplary embodiment, the second sealing member 40 further includes the protrusion 50. The protrusion 50 may be disposed on the sealing body part 41 connected with the tooth part 43 so that the fluid is pushed toward the outer side of the rotation direction. In detail, one or more protrusions 50 may be disposed in a row at a predetermined angle with the spiral S4, as illustrated in FIG. 5A. According to the fourth exemplary embodiment, the protrusion part 50 is disposed perpendicularly to the spiral S4.

Referring to FIG. 5B, when the rotating body 30 rotates, the protrusion 50 rotates together therewith, and the fluid flowing between the spiral S4 is pushed toward the outer side direction by climbing over the protrusion 50. In this case, the fluid is pushed further toward the first sealing member 20, thus a stronger fluid barrier (A5 region in FIG. 5B) than that of the first exemplary embodiment may be formed. The fluid barrier hinders the flow of the fluid passing through the gap between the first sealing member 20 more strongly and the second sealing member 40, thereby ultimately blocking the leakage of the fluid more thoroughly.

Height L2 of the protrusion 50 is lower than height L1 of the spiral S4. If the height of the protrusion 50 is the same as or higher than the height of the spiral S4, the protrusion 50 hinders the flow of the fluid flowing between the spiral S4. Therefore, there may be a problem in transferring the leaked fluid toward the introduction direction of the leaked fluid again.

When the height of the protrusion 50 is lower than the height of the spiral S4, flow of the fluid is not hindered, and at the same time, the reinforced fluid barrier may be formed, such that the characteristic of the protrusion 50 is more clearly exhibited. In one exemplary embodiment, the height of the protrusion part 50 is half or less of the height of the spiral part S4.

Further, the protrusion 50 may have a curved slope 50a formed on at least one side thereof so that the fluid is smoothly pushed toward the outer side of the rotation direction. The fluid is smoothly pushed toward the outer side along the curved slope 50a, thus the fluid barrier (A5 region in FIG. 5) may also be stably formed without an eddy phenomenon. As such, in addition to the effect presented in the first exemplary embodiment, the leakage of the fluid may be more thoroughly prevented by reinforcing the fluid barrier through the protrusion part 50.

Figure 6:
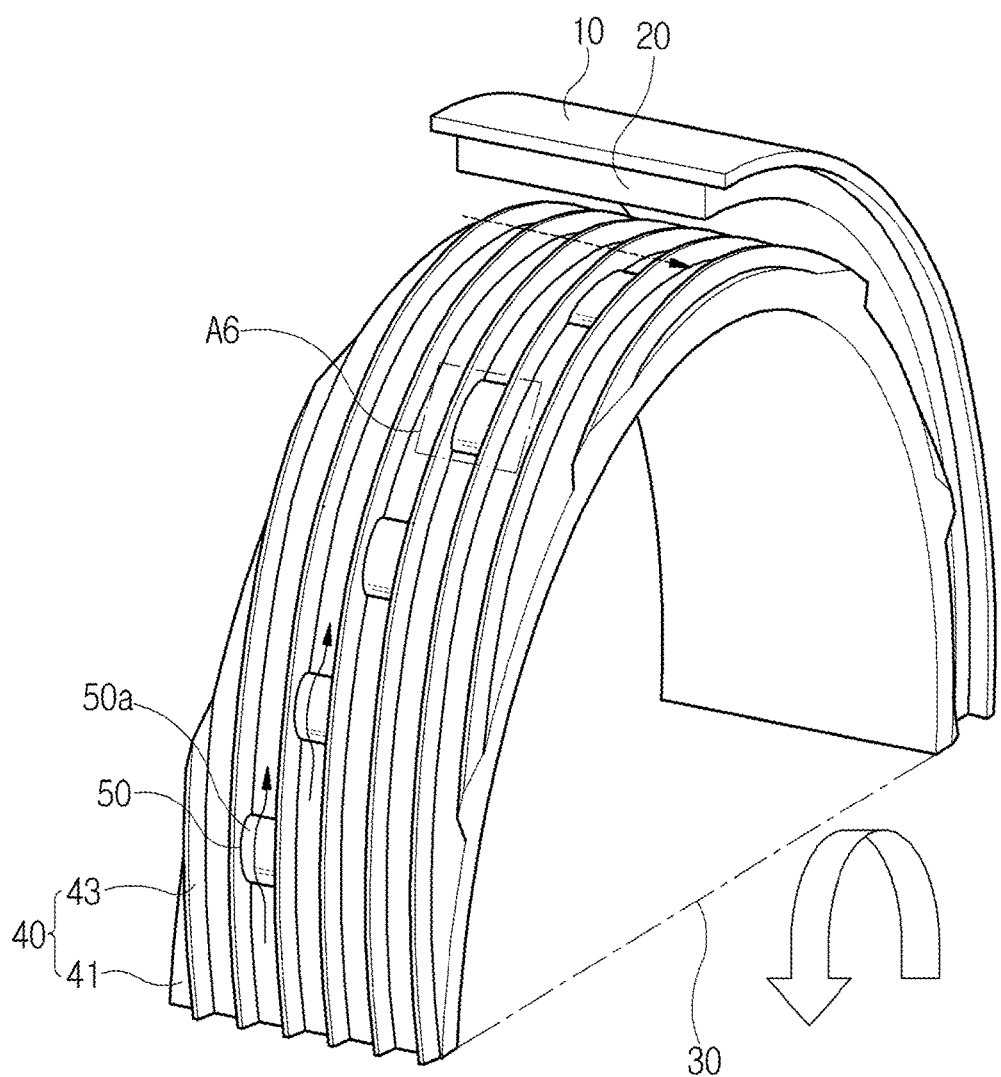
FIG. 6 is a partial perspective view showing a sealing assembly according to a fifth exemplary embodiment.

FIG. 6 is a partial perspective view showing a sealing assembly according to a fifth exemplary embodiment. Referring to FIG. 6, a sealing assembly according to a fifth exemplary embodiment may include a first sealing member 20 and a second sealing member 40. The description of the disposition, the shape, and the material for the first sealing member 20 and the second sealing member 40 is the same as that of the first exemplary embodiment, and thus will not be described again.

Describing an exemplary configuration of the second sealing member 40 in detail, the second sealing member 40 may include a sealing body part 41, a tooth part 43, and a protrusion 50. The sealing body part 41 may be mounted on the outer surface of the rotating body 30 in the circumferential direction, and the tooth part 43 may be disposed on the sealing body part 41 to protrude therefrom. The tooth part 43 may be formed including a spiral S5 in a direction reverse to a direction in which the fluid is leaked. Referring to FIG. 6, the spiral S4 is disposed on the sealing body part 41. Shape and function of the spiral S5 are the same as in the first exemplary embodiment, and thus will not be described again.

According to the fifth exemplary embodiment, the second sealing member 40 further includes the protrusion 50. The protrusion 50 may be disposed on the sealing body part 41 connected with the tooth part 43 so that the fluid is pushed toward the outer side of the rotation direction. In detail, one or more protrusions 50 may be disposed at a predetermined angle with the spiral S5, as illustrated in FIG. 6. Unlike the fourth exemplary embodiment, the protrusion 50 may be disposed at different intervals between the spiral S5. Descriptions of the height of the protrusion 50 and the curved slope 50a are the same as in the fourth exemplary embodiment, thus will not be described again.

Referring to FIG. 6, when the rotating body 30 rotates, the protrusion 50 rotates together therewith, and the fluid flowing between the spiral S5 is pushed toward the outer side direction by flowing over the protrusion 50. In this case, the fluid is pushed further toward the first sealing member 20, thus a stronger fluid barrier than that of the first exemplary embodiment may be formed. The fluid barrier hinders the flow of the fluid passing through the gap between the first sealing member 20 and the second sealing member 40 more strongly, thereby ultimately blocking the leakage of the fluid more thoroughly.

In this case, as the protrusion 50 are disposed at a predetermined interval between the spiral S5, when the rotating body 30 rotates, a reinforced fluid barrier is formed gradationally in the gap between the first sealing member 20 and the second sealing member 40 at different points, thereby hindering the leakage of the fluid. As such, in addition to the effect presented in the first exemplary embodiment, the leakage of the fluid may be ultimately prevented by gradationally reinforcing the fluid barrier through the protrusion 50 at different points.

The above description merely illustrates exemplary embodiments of the sealing assembly. Therefore, it is to be noted that the present invention may be variously substituted and modified by those skilled in the art without departing from the spirit of the present invention as disclosed in the accompanying claims.

According to the exemplary embodiments, it is possible to prevent leakage of fluid by forming a spiral in a direction reverse to a leakage direction of the fluid in the sealing components between the rotating body and the fixed body to return the leaked fluid back in the introduction direction of the fluid.

Further, it is possible to hinder the leakage of the fluid by forming a fluid barrier between the rotating body and the fixed body using centrifugal force by which the fluid is pushed in a direction from the rotating body to the fixed body at the time of high-speed rotation of the rotating body.

Further, since the leakage of the fluid is prevented in the state in which a predetermined gap is maintained without direct contact between the sealing component of the rotating body and the sealing component of the fixed body, it is possible to prevent rubbing of the sealing components and a breakdown of the sealing components.

Above-described effects ultimately minimize output loss due to the leakage of the fluid, thus the efficiency of the turbine, for example, may be improved, and lifespan and replacement period of the sealing components may be extended, thereby reducing maintenance cost for the turbine.

What is claimed is:

1. A sealing assembly, comprising:
   a first sealing member disposed on an inner circumferential surface of a fixed body;
   a second sealing member disposed on an outer circumferential surface of a rotating body configured to rotate with respect to the first sealing member, the second sealing member including
      a sealing body part disposed on the outer circumferential surface of the rotating body, and
      a tooth part disposed on the sealing body part and including a spiral, the spiral including a spiral segment having opposite ends offset from each other; and
   a fluid barrier formed between the first sealing member and the second sealing member by transfer fluid flowing in a direction reverse to a direction of a fluid leak,
   wherein the spiral includes a step portion connecting the opposite ends of the spiral segment, the step portion configured to push rotating fluid toward an introduction side of the leaked fluid to form the fluid barrier in a gap between the first sealing member and the second sealing member.

2. The sealing assembly of claim 1, wherein the step portion is connected to either of the opposite ends of the spiral segment at a predetermined angle.

3. The sealing assembly of claim 1, wherein the opposite ends of the spiral segment include a first end and a second end, the second end disposed closer to the introduction side of the leaked fluid than the first end, and wherein the pushed fluid travels along the spiral from the first end to the second end by passing over the step portion.

* * * * *